United States Patent
Cerveny et al.

(10) Patent No.: US 9,117,326 B2
(45) Date of Patent: Aug. 25, 2015

(54) APPARATUS FOR PACKAGING DRINKING WATER

(75) Inventors: Jean-Paul Cerveny, Vittel (FR); Christian Detrois, Golbey (FR); Klaus Hartwig, Nancy (FR); Erik Lupke, Vittel (FR); Murielle Vigny-Schmitt, Vittel (FR)

(73) Assignee: Nestec S.A., Vevey (CH)

( * ) Notice: Subject to any disclaimer, the term of this patent is extended or adjusted under 35 U.S.C. 154(b) by 974 days.

(21) Appl. No.: 13/266,066

(22) PCT Filed: Mar. 25, 2010

(86) PCT No.: PCT/EP2010/053862
§ 371 (c)(1),
(2), (4) Date: Jan. 25, 2012

(87) PCT Pub. No.: WO2010/121880
PCT Pub. Date: Oct. 28, 2010

(65) Prior Publication Data
US 2012/0160927 A1    Jun. 28, 2012

(30) Foreign Application Priority Data
Apr. 25, 2009  (EP) ............................ 09005792

(51) Int. Cl.
B65B 3/06     (2006.01)
A47J 31/40    (2006.01)
G07F 13/10    (2006.01)
(Continued)

(52) U.S. Cl.
CPC ............... *G07F 13/10* (2013.01); *A47J 31/40* (2013.01); *A47J 31/41* (2013.01); *B65B 3/06* (2013.01); *B65B 3/16* (2013.01); *B65B 3/28* (2013.01); *B65B 3/30* (2013.01); *B65B 43/123* (2013.01);
(Continued)

(58) Field of Classification Search
CPC  B65B 43/267; B65B 43/123; B65B 2210/08; B65B 2210/06; B65B 2220/14; B65B 3/30; B65B 3/28; B65B 3/16; B65B 3/06; B65B 85/8043; A47J 31/41; G07F 13/065
USPC ............ 53/111 R, 167, 237, 239, 240, 284.7; 141/100, 103, 105
See application file for complete search history.

(56) References Cited

U.S. PATENT DOCUMENTS 2,783,704 A *  3/1957  Liebelt ........................... 141/86
3,087,518 A *  4/1963  Scholle .......................... 141/83
(Continued)

FOREIGN PATENT DOCUMENTS

DE    9116671    9/1993
EP    1950150    7/2008
(Continued)

OTHER PUBLICATIONS

PCT International Search Report for Application No. PCT/EP2010/053862—Mailing Date of Jun. 23, 2010, 4 Pages.

Primary Examiner — Stephen F Gerrity
(74) Attorney, Agent, or Firm — K&L Gates LLP

(57) ABSTRACT

The disclosure concerns a water fountain for in-home delivery of drinkable water, the fountain including a combination of at least: a source, preferably a renewable source, of drinkable water, with a stock of packages, with a filling member for filling at least one package with drinkable water, and a sealing member for sealing individual filled packages before delivery to the consumer.

17 Claims, 13 Drawing Sheets

(51) Int. Cl.
  *B65B 3/30* (2006.01)
  *B65D 85/804* (2006.01)
  *G07F 13/06* (2006.01)
  *A47J 31/41* (2006.01)
  *B65B 3/16* (2006.01)
  *B65B 3/28* (2006.01)
  *B65B 43/12* (2006.01)
  *B65B 43/26* (2006.01)

(52) U.S. Cl.
  CPC .......... *B65B 43/267* (2013.01); *B65D 85/8043* (2013.01); *G07F 13/065* (2013.01)

(56) References Cited

U.S. PATENT DOCUMENTS

| | | | | |
|---|---|---|---|---|
| 3,337,117 A | * | 8/1967 | Lehmacher et al. | 383/37 |
| 3,352,460 A | * | 11/1967 | Herring | 222/129.4 |
| 3,638,392 A | * | 2/1972 | Welker, Jr. et al. | 53/239 |
| 4,110,956 A | * | 9/1978 | Weisberg | 53/384.1 |
| 4,417,607 A | * | 11/1983 | Scholle et al. | 53/167 |
| 4,594,838 A | * | 6/1986 | Ficken et al. | 53/485 |
| 4,598,529 A | * | 7/1986 | Pongrass et al. | 53/570 |
| 4,886,674 A | * | 12/1989 | Seward et al. | 426/79 |
| 4,981,374 A | * | 1/1991 | Rutter et al. | 383/37 |
| 5,000,345 A | * | 3/1991 | Brogna et al. | 141/103 |
| 5,067,310 A | * | 11/1991 | Yamanaka | 141/105 |
| 5,361,560 A | * | 11/1994 | Sandolo | 53/111 RC |
| 5,570,816 A | * | 11/1996 | LaBarbera, Jr. | 222/129.4 |
| 5,605,183 A | * | 2/1997 | Hartman et al. | 141/237 |
| 5,630,310 A | | 5/1997 | Chadwell | |
| 6,742,552 B2 | * | 6/2004 | Raniwala | 141/103 |
| 7,316,249 B2 | * | 1/2008 | Cheong | 141/100 |
| 7,513,218 B1 | * | 4/2009 | Handley et al. | 119/456 |
| 7,533,512 B2 | * | 5/2009 | Levati et al. | 53/167 |
| 7,571,586 B1 | * | 8/2009 | Morales | 53/167 |
| 7,958,697 B2 | * | 6/2011 | Rapparini | 53/425 |
| 8,056,510 B2 | * | 11/2011 | Handley et al. | 119/72 |
| 8,327,607 B2 | * | 12/2012 | Nighy | 53/284.7 |
| 2005/0092389 A1 | * | 5/2005 | Mazur et al. | 141/100 |
| 2008/0148948 A1 | * | 6/2008 | Evers et al. | 99/275 |
| 2010/0112180 A1 | * | 5/2010 | Laniado | 426/590 |
| 2013/0224344 A1 | * | 8/2013 | Mathieu | 426/115 |

FOREIGN PATENT DOCUMENTS

| | | | | |
|---|---|---|---|---|
| FR | 2547278 A1 | * | 12/1984 | 53/284.7 |
| WO | 2004024563 | | 3/2004 | |
| WO | WO 2008037974 A1 | * | 4/2008 | B65B 43/123 |
| WO | WO 2008084234 A2 | * | 7/2008 | 53/284.7 |

* cited by examiner

APPARATUS FOR PACKAGING DRINKING WATER

CROSS REFERENCE TO RELATED APPLICATIONS

The present application is a National Stage of International Application No. PCT/EP2010/053862, filed on Mar. 25, 2010, which claims priority to European Patent Application No. 09005792.8, filed on Apr. 25, 2009, the entire contents of which are being incorporated herein by reference.

FIELD OF THE INVENTION

The present invention concerns a water fountain. More particularly, it is directed to a water fountain that fills water into individual packages and seal the latter before delivering said filled and sealed packages to a consumer.

BACKGROUND OF THE INVENTION

For providing water to the consumer at home, water fountains are known, which comprise a water supply that can be directly taken from tap water—that is to say from a public water supply—or from a disposable water container that can be adapted to the fountain in a leak-tight configuration.

Some of these water fountains include a system for refrigerating said water before it is dispensed to a consumer. The water is dispensed through a manual or electric dispensing pump system that conducts the water from the water supply to a cup that the consumer places below a tap-like opening of the fountain. A system of waste disposal is needed, in order to recuperate an overflow of the water.

The solutions disclosed above, however do not allow a consumer to take water from the fountain and transport or store for some time the water that is dispensed for an "on-the-go" consumption of said water, eg. for children taking water to school, or for in-car consumption. In these last two cases, the only way for a consumer to carry water is to go to a store and buy bottles of water. However, such bottles are heavy, and ecologically unfriendly as they require a large amount of packaging material, plus operations in the factories to close with closures or similar systems, print, gather in packs or otherwise pack in secondary packages before shipping—which shipping has a bad ecological footprint—.

The main problem to be solved by the present invention is therefore to provide a home delivery system for delivering at a low cost and ecologically, safe drinkable water, or other beverages, to consumers. Such a system shall be an easy to use, reduced in size, and be a cheap and ecological alternative to bottled water and to known water fountains for in-home usage.

SUMMARY OF THE INVENTION

Such a problem is solved by the present invention with a water fountain for in-home delivery of drinkable water, said fountain comprising a combination of at least:
(i) a source, preferably a renewable source, of drinkable water, with
(ii) a stock of packages, with
(iii) filling means for filling at least one package with drinkable water, with
(iv) sealing means for sealing individual filled packages before delivery to the consumer.
In a first embodiment, the source of water is a container disposed into a receptacle of the water fountain.

In a second possible embodiment, the source of water is public water supply connected to said fountain via a leak-proof pipe.

Advantageously, the water fountain according to the present invention further comprises means for adding at least one ingredient to the water before it is filled into a package, said ingredient being selected in the list of: mineral salts, vitamins, flavours, colorants, prebiotics, probiotics, sugar/sweeteners, preservatives, plant extracts, or a combination thereof.

Preferably, said means for adding at least one ingredient to the water comprise:
(i) at least one capsule containing said ingredient,
(ii) a pump means for pumping said water from said source of water through said capsule so that said ingredient is mixed to the water, and
(iii) conduct means for conducting said mix of water and ingredient to the filling means for filling said mix into a package.

In the latter case, the said capsule is advantageously a one-use disposable capsule.

In a preferred embodiment of the invention, said filling means comprise at least one pair of rolls for holding the package, said rolls comprising cooperating grooves that define a passage through which a filling needle can move to fill the package.

Also advantageously, the stock of packages comprises premade film pouches stored as a continuous roll, so that to adjacent pouches in the roll are linked in a detachable manner by a precut seam.

Preferably, the packages contain dry or liquid ingredients such as flavors, minerals, plant extracts, vitamins, sugar/sweetener, nutritional complements, preservatives prior to their filling with water.

In one embodiment, the packages have several separate chambers that can be arranged in different configurations so that they are self standing with a base area similar to a circle, snail, star, triangle or bar-bell.

Advantageously, said packages can be one use disposable packages.

Preferably, the filling means comprise anti-contamination means to prevent contamination of water during the filling of packages and ensure an aseptic filling. In that case, the anti-contamination means preferably comprise an hygienic chamber for containing the stock of packages and the filling means. More preferably, the hygienic chamber is a removable disposable cartridge.

In any case, the filling means preferably further comprise weighing means for the control of the filled volume into the package.

Alternatively, or in combination with the weighing means, the filling means can further comprise a volumetric filling system for the control of the filled volume of beverage into the package, and/or a flow meter and/or an intermediate tank.

In a preferred embodiment of the invention, the fountain comprises an automatic sanitation self-cleaning system for cleaning the interior of said fountain.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

The present invention is meant for home use, which means that the overall volume of the water fountain according to the present invention shall be reduced, so that it is compatible with an installation in a flat, or in a house, for instance in a kitchen. By in home use, it is also meant that the present invention shall be also used in offices. Preferably, the overall volume of said fountain is less than 1 m$^3$, preferably less than 0.5 m$^3$, even more preferably less than 0.2 m$^3$.

Figure 1:
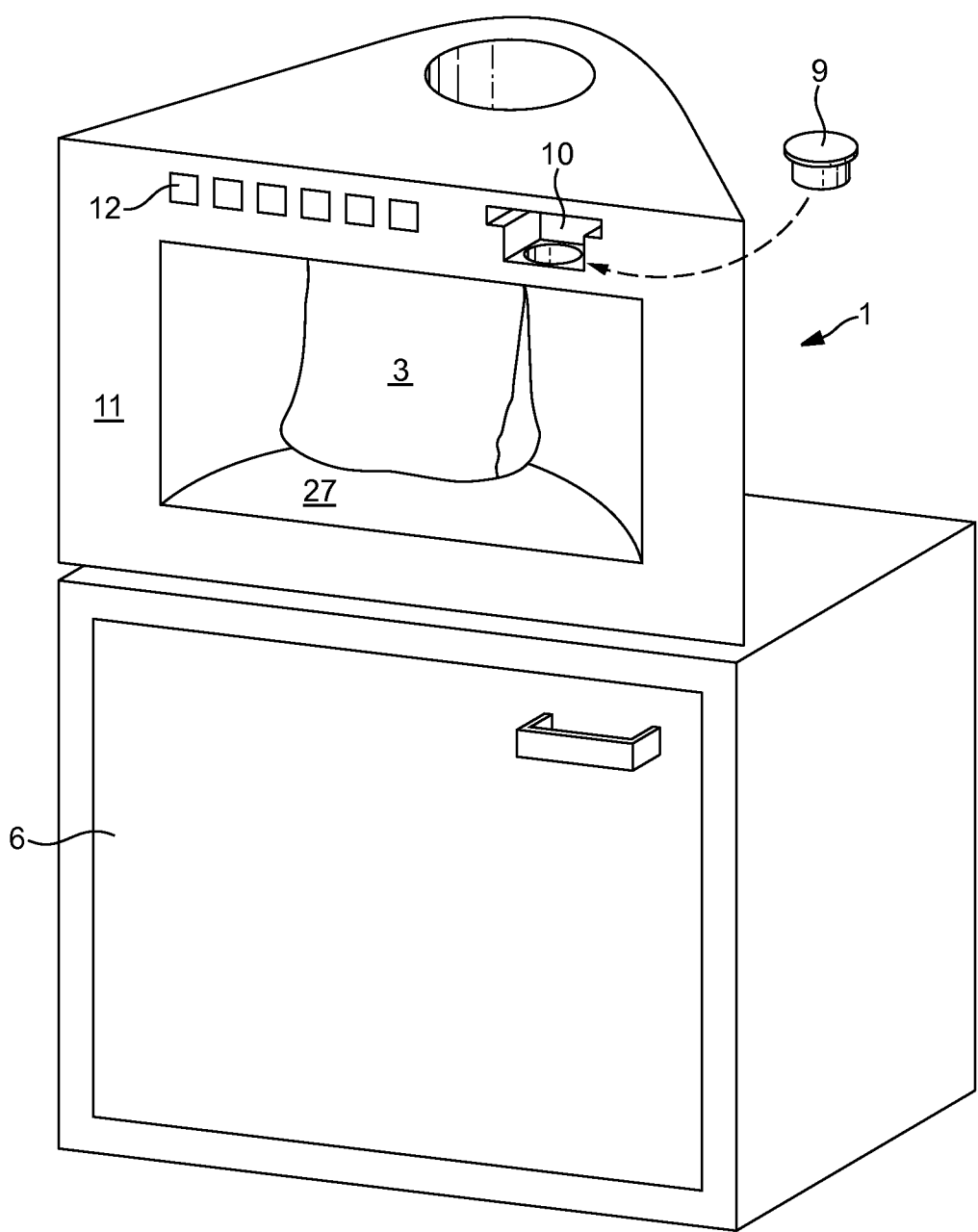
FIG. 1 is a schematic perspective front view of a water fountain according to the invention.

A first possible embodiment of the invention is illustrated in FIG. 1. In this embodiment, a water fountain 1 according to the invention is provided for the delivery of drinkable water to a consumer. According to the invention, the water fountain comprises a combination of:

(i) a renewable source 2 of drinkable water, with
(ii) a stock of packages 3, with
(iii) filling means for filling at least one package 3 with drinkable water, with
(iv) sealing means for sealing individual filled packages before delivery to the consumer.

The source of water is a container disposed into a receptacle 6 of the water fountain 1.

The fountain is provided with a main supply 7 for providing electricity to the different constitutive elements (pumps, valves, electronic boards, etc) of the filling and sealing means, as well as for the water refrigeration system in case said fountain comprises one.

The water fountain according to the present invention further comprises means for adding at least one ingredient to the water before it is filled into a package 3, said ingredient being selected in the list of: mineral salts, vitamins, flavours, colorants, prebiotics, probiotics, sugar/sweeteners, preservatives, plant extracts, or a combination thereof.

The said means for adding at least one ingredient to the water comprise:

(i) at least one capsule 9 containing said ingredient to be inserted into a dedicated receptacle 10 of the fountain,
(ii) a pump means—not illustrated in the drawing—for pumping said water from said source of water 2 through said capsule 9 so that said ingredient is mixed to the water, and
(iii) conduct means for conducting said mix of water and ingredient to the filling means 4 for filling said mix into a package 3.

The capsule 9 is a one-use disposable capsule. In order to add one or several ingredients to the water, the consumer inserts a capsule into the receptacle 10 disposed onto the front panel 11 of the fountain. The consumer then presses a command button 12 to actuate the distribution of a package 3 of water. The fountain comprises an electronic board (not illustrated in the drawing) which manages the different steps of filling, sealing and distributing a filled and sealed pouch into a dispensing drawer 27 of the fountain.

Figure 2:
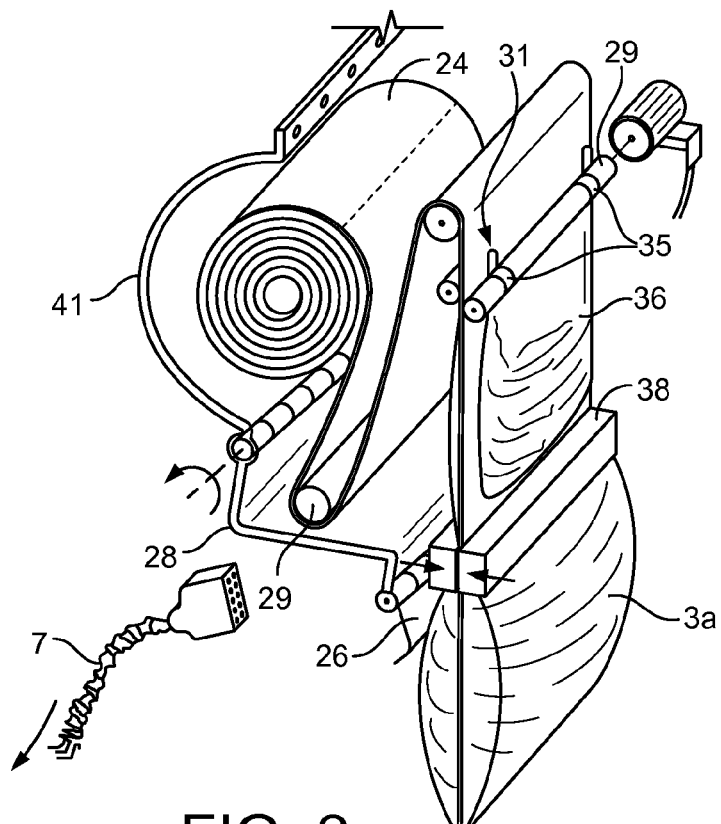
FIG. 2 is a schematic perspective view, partially cut, of a replaceable cartridge containing packing, filling and sealing units.
Figure 3:
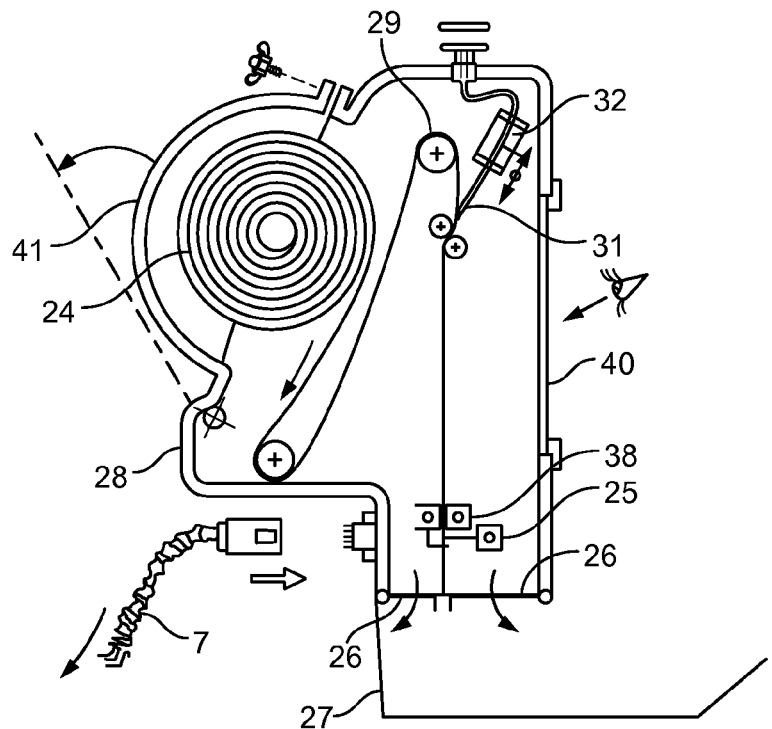
FIGS. 3 and 4 are schematic profile views, partially cut, similar to FIG. 7.
Figure 4:
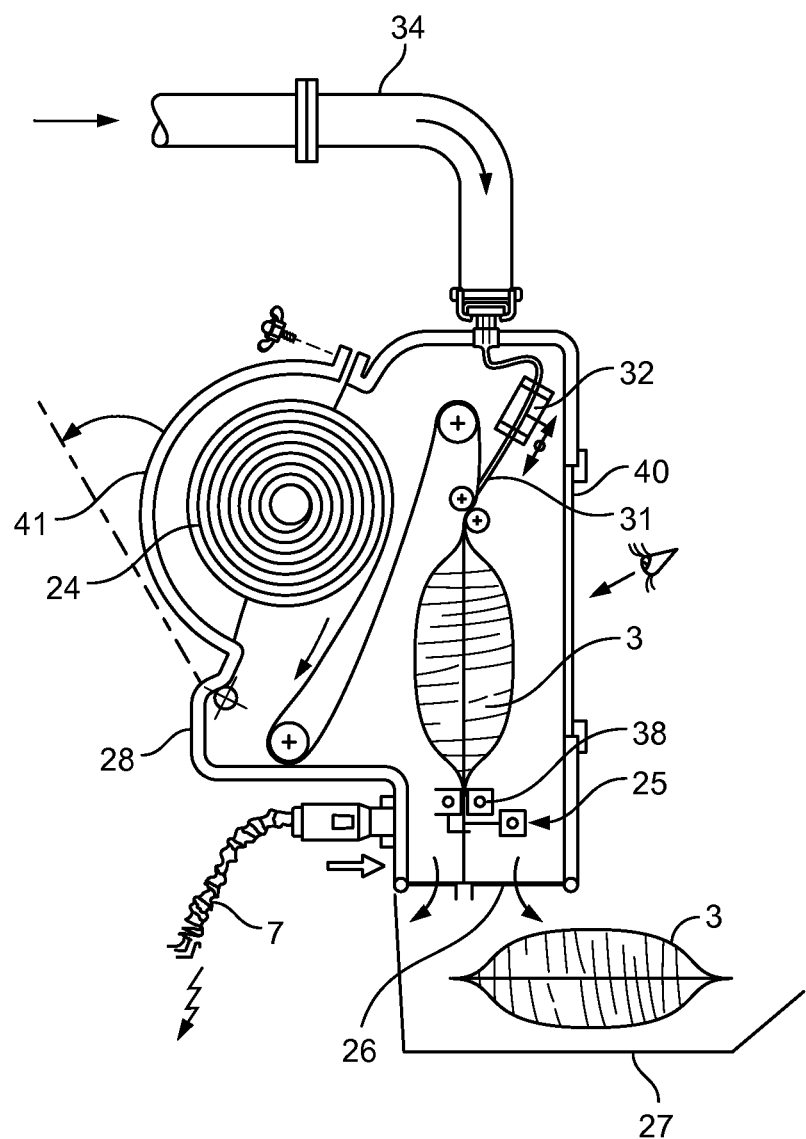

The stock of packages is a roll of premade pouches 24, as illustrated for instance in FIGS. 2, 3, 4.

The fountain 1 also comprises distribution means as shown in FIGS. 3 and 4 for distributing one pouch 3 at a time from the roll of pouches 24, the said distribution means comprising a cutting means 25 to cut and separate one package 3 from the rest of the package rolls 24, once the said package 3 is filled and sealed, and a system of dispensing doors 26 with a dispensing drawer 27 to give the consumer an access to the filled pouch 3 once the latter is separated from the rest of packages/pouches roll 24 and has fell into the said drawer 27 as illustrated in FIG. 4. The dispensing doors 26 can be motorized and automatically open when a filled and sealed pouch 3 is ready to be fall into the dispensing drawer 27.

The filling means are provided for aseptically filling a package 3 with water as well as sealing means for sealing said package 3 after its filling. The filling and sealing means will be described in more detail herebelow.

As shown in FIGS. 2, 3 and 4, said filling, sealing and distribution means are advantageously disposed in a casing 28 so as to form a one-use hermetically closed cartridge 28. The cartridge 28 also encloses the stock of packages 24.

As illustrated in FIGS. 2, 3, 4, 8, and 9, the filling means 4 comprise one pair of rolls 29 for holding the package 3 that is being filled.

Figure 8:
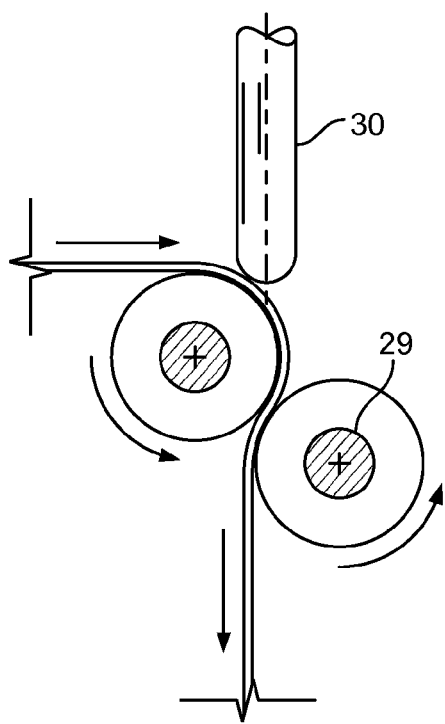
FIG. 8 is a schematic perspective view showing the filling unit for pouches, according to the invention.
Figure 9:
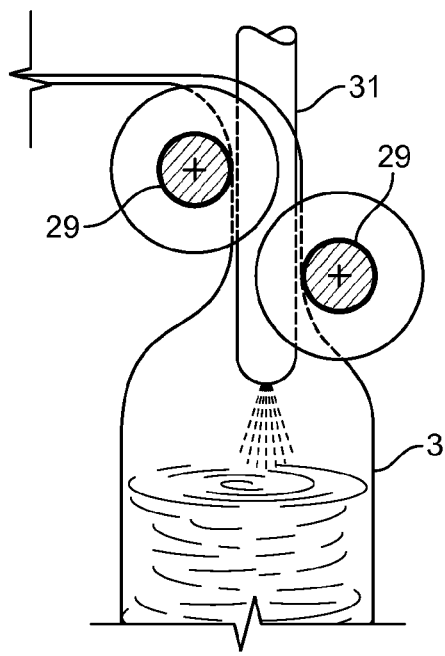
FIG. 9 is a profile view similar to FIG. 8 where the filling needle is not yet inserted into the pouch filling opening.

The rolls 29 comprise cooperating grooves 30 that define a passage through which a filling needle 31 can move to fill the package 3, as can be seen also in FIGS. 8 and 9.

As illustrated in FIGS. 5 to 7 and 10 to 13, the stock of packages 24 comprises premade film pouches 3 stored as a continuous roll of film 24, so that two adjacent pouches 3 in the roll 24 are linked in a detachable manner by a precut seam 46. These packages are non reclosable, and for that reason, they have an opening 36 which is destructed by cutting, ripping, tearing, piercing, or a combination thereof.

In each pouch 3, the premade weld seam length represents at least 70% of the final weld seam length, in other words the area that is not seamed when the pouch is still in the roll of pouches, is less than 30% of the seam length that is necessary for having an entirely closed package.

Each package used to pack water in the field of the present invention, is preferably shaped such that the material constitutive of the package body in one cross-section, extends beyond the boundaries of the filling opening. This ensures that the dispensing opening of the package is somehow protected by the boundaries of the package, and is therefore more mechanically resistant.

Advantageously, the packages 3 are realized as premade preferably decorated/printed packages. In case a decoration or printing is needed onto the packages, the film for making said pouches 3 is preferably pre-printed before being formed into a roll of pouches as will be described hereafter.

In FIGS. 2, 3 and 4, one can see that the roll of pouches 24 is meant to be mounted into the apparatus according to the invention, such that the free end of pouches runs through filling means and sealing means that ensure respectively that water is filled into each pouch 3, and then said filled pouch 3 is sealed.

The filling means comprises a pipe 34 that conveys water from the water source 2. This pipe 34 is linked to a filling pump—not illustrated in the drawing—coupled to an electronic management system—not illustrated in the drawing—that synchronises the movements of the roll of pouches together with the filling pump and the sealing means.

The pipe 34 is linked to a filling needle 31 that is movable in a back-and-forth movement relative to the pouch that is being filled, as can be seen in detail in FIGS. 3, 4, 8 and 9. The needle 31 is moved with a piston-like system 31 that can be seen in FIG. 4.

In FIGS. 2, 8 and 9, one can see that a pouch 3 is being filled and is held by a pair of rolls 29. As shown particularly in FIG. 2, each roll is equipped with rubber surfaces 35 that have a gripping effect onto the surface of the pouch surface, so that the pouch does not slip away during the filling operation.

As shown in FIGS. 6, 7, and 10 to 14, the pouch 3 comprises a rounded opening 36 through which the filling needle 31 of the filling system can penetrate before the filling operation starts. Once the pouch is filled, the needle 31 is removed from the pouch, and the latter is sealed by the sealing means. Alternatively to a filling opening, the pouch could be provided with a filling zone of the pouch wall, which would be punctured by the filling needle at the time the filling operation is performed, or also the filling area could be punctured as a pre-filling step to create an opening just before the filling needle is inserted into the pouch to fill the said pouch.

The two rolls 29 that hold the pouch 3 during the filling operation, both comprise grooves, that are positioned in vis-à-vis one relative to the other, so that the two cooperating grooves define a channel which has a diameter superior or equal to that of the filling needle 31, so that said needle can move back and forth in between the rolls 29 during the filling operation.

FIG. 2 shows a roll of pouches 24 that is disposed into the filling means and sealing means. One pouch 3a is already filled and is being sealed, and the pouch 3b above in the roll of pouches is being filled. The sealing means comprise a pair of sealing jaws 38 that are movable in a back and forth reciprocating movement by actuating means—not shown in the drawing—for instance a pneumatic piston, or an electric motor, similarly to sealing jaw systems commonly known to those skilled in the art.

Once a pouch 3 is filled with safe drinkable water, the roll of pouches 24 is unrolled, so that the upper edge 39 of the filled pouch is disposed between the sealing jaws 38. The unrolling movement is then stopped and the sealing jaws 38 are moved towards each other as illustrated with arrows in FIG. 2 so as to seal the opening 36 of the pouch 3, and then backwards so as to release the pouch that is now filled and sealed. The unrolling operations then starts again so that the pouch that is filled and sealed can be directed to the cutting means 25 to be detached from the roll of pouches 24, and fall into the dispensing drawer 27. The cutting means can be a cutting blade that is moved back and forth with an electric motor.

As already described above and as shown in FIG. 3, the roll of pouches 24, the filling means 4 and the sealing 5 and cutting 25 means can be enclosed into a casing (or otherwise called "cartridge") 28. Once a filled and sealed pouch 3 is detached from the roll of pouches 24, it falls into a dispensing drawer 27, as shown in FIG. 4. The front part of the casing 28 can be equipped with a window 40 for the consumer to watch the filling, sealing and cutting operations through the fountain wall, as illustrated in FIG. 4. The casing 28 comprises a backdoor 41 to access the interior of the said casing and replace the roll of pouches 24 when necessary.

Figure 5A:
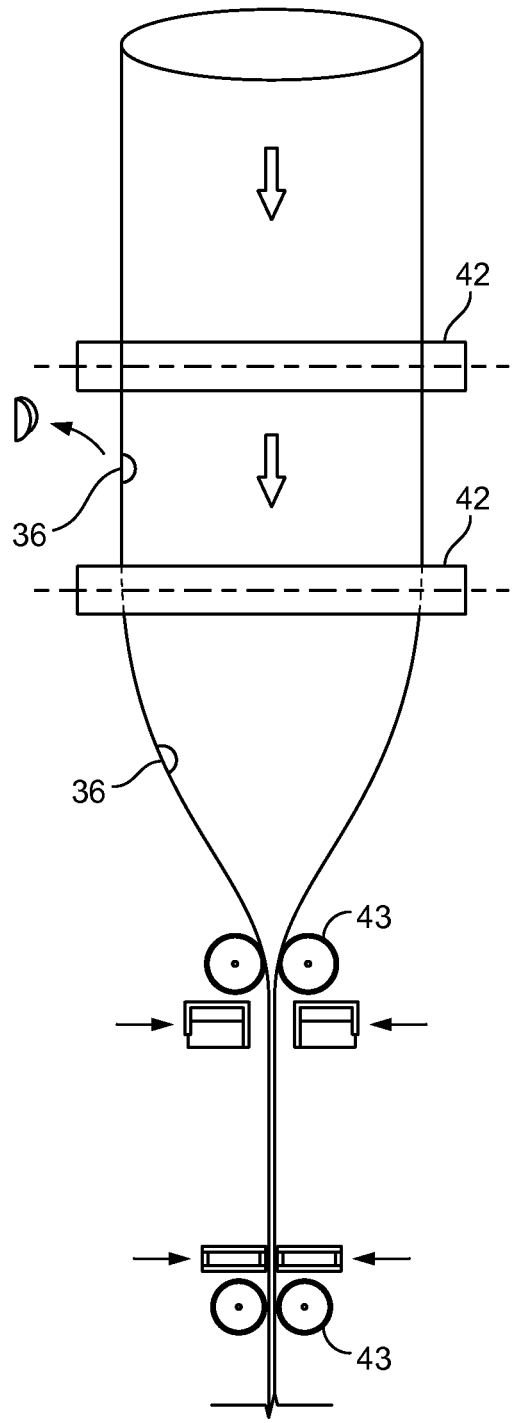
FIGS. 5A & 5B are schematic, respectively side and front views, representing an integrated pouch manufacturing line for a water fountain according to the present invention.
Figure 5B:
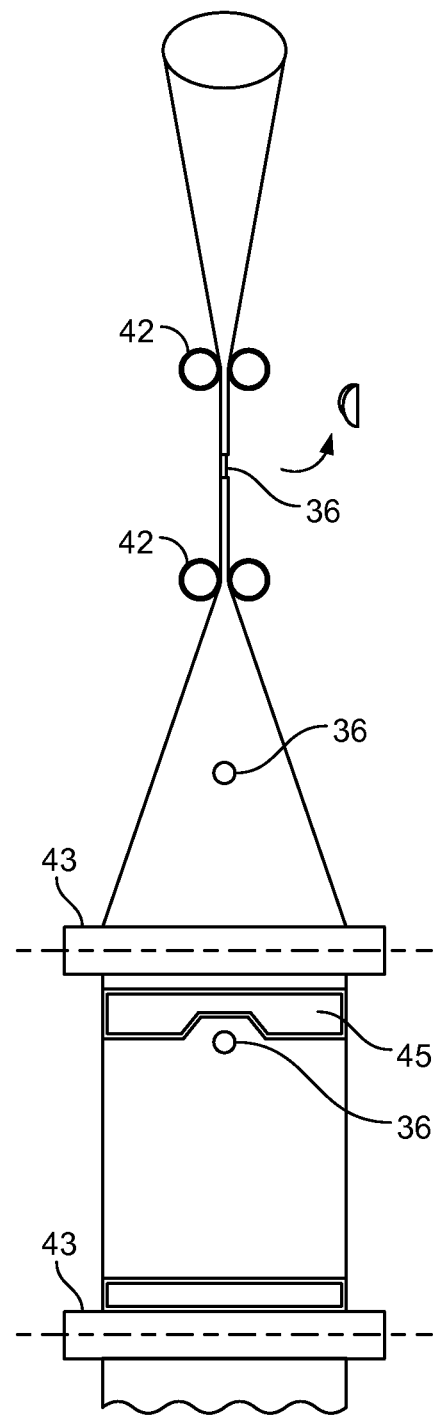

The pouches 3 described above are manufactured as a roll of pouches 24, with a continuous process illustrated in FIGS. 5A and 5B, wherein FIG. 5B is a 90° side view of the FIG. 5A, so as to show how the film is folded during the forming operation.

The roll of pouches 24 is formed out of a thermoplastic film that is rolled and sealed longitudinally into a tube. Two pairs of rolls 42 that are disposed spaced apart from one another fold the film, and openings 36 are cut by punching at regular intervals along the roll. Then, another pair of rolls 43 folds the tube of film at a 90° angle relative to the longitudinal axis of said tube, and two pairs of sealing jaws 44 seal the pouch at its upper and lower extremities, as illustrated in FIGS. 5A and 5B. As can be seen in FIG. 5B, the upper seal 45 has a specific shape which allows positioning this upper seal 45 very close to the pouch opening 36. At the same time the sealing jaws 44 create a seal to close the upper and lower edges of a pouch, they create transversal pre-cut seam lines 46 respectively above and below the upper and lower seals of the pouch 3. The pre-cuts 46 are made by cutting tools—not shown in the drawings—that are integrated in the sealing jaws 44.

Figure 6:
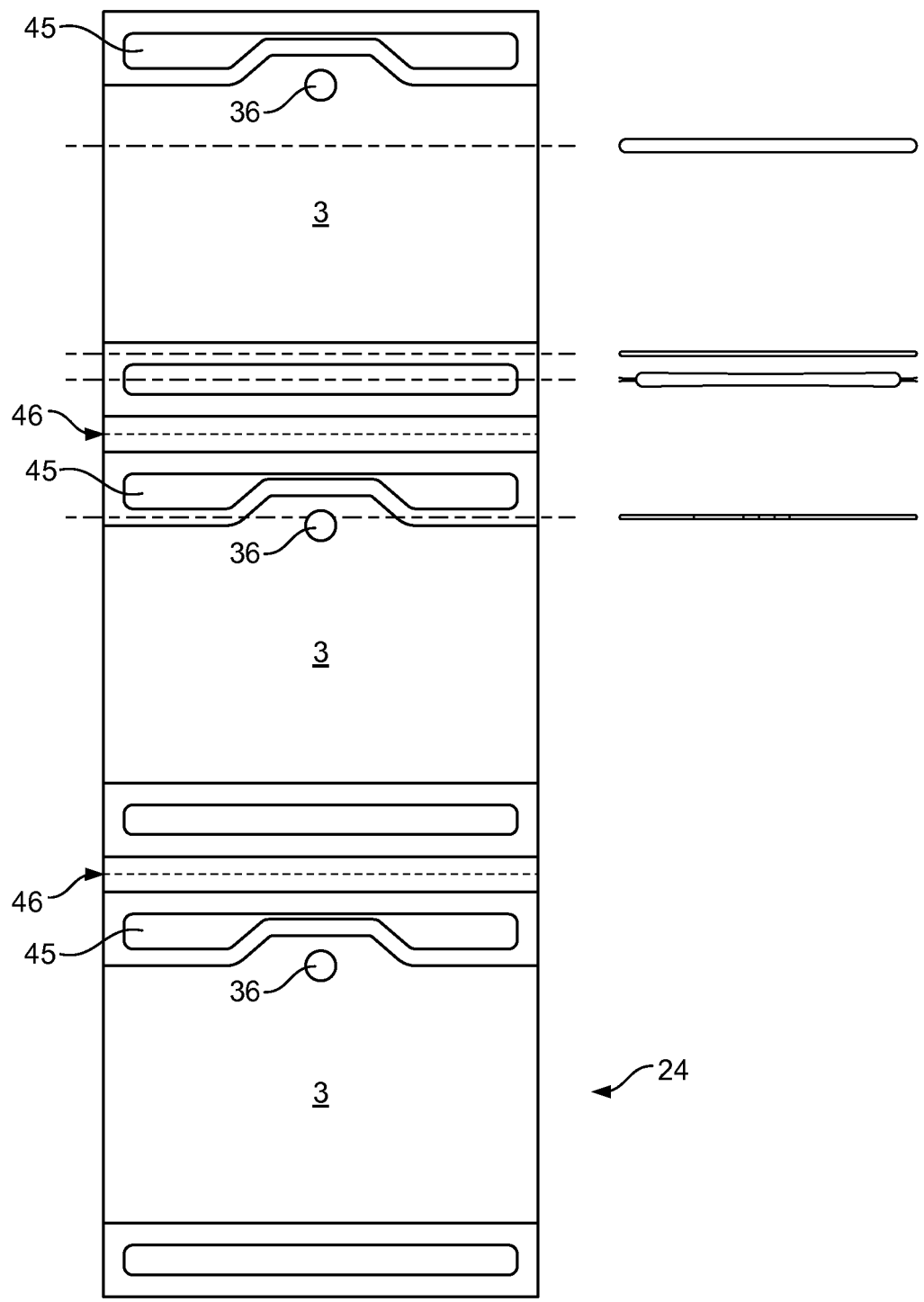
FIG. 6 is a schematic perspective view showing a roll of premade pouches manufactured with a line illustrated in FIGS. 10A & 10B.

FIG. 6 illustrates a roll of pouches 24 that is obtained with a process as described above. One can see that two consecutive pouches 3 in the roll 24 are linked by a detachable—or tearable—pre-cut line 46 that is transversally disposed along the width of the roll.

Figure 7:
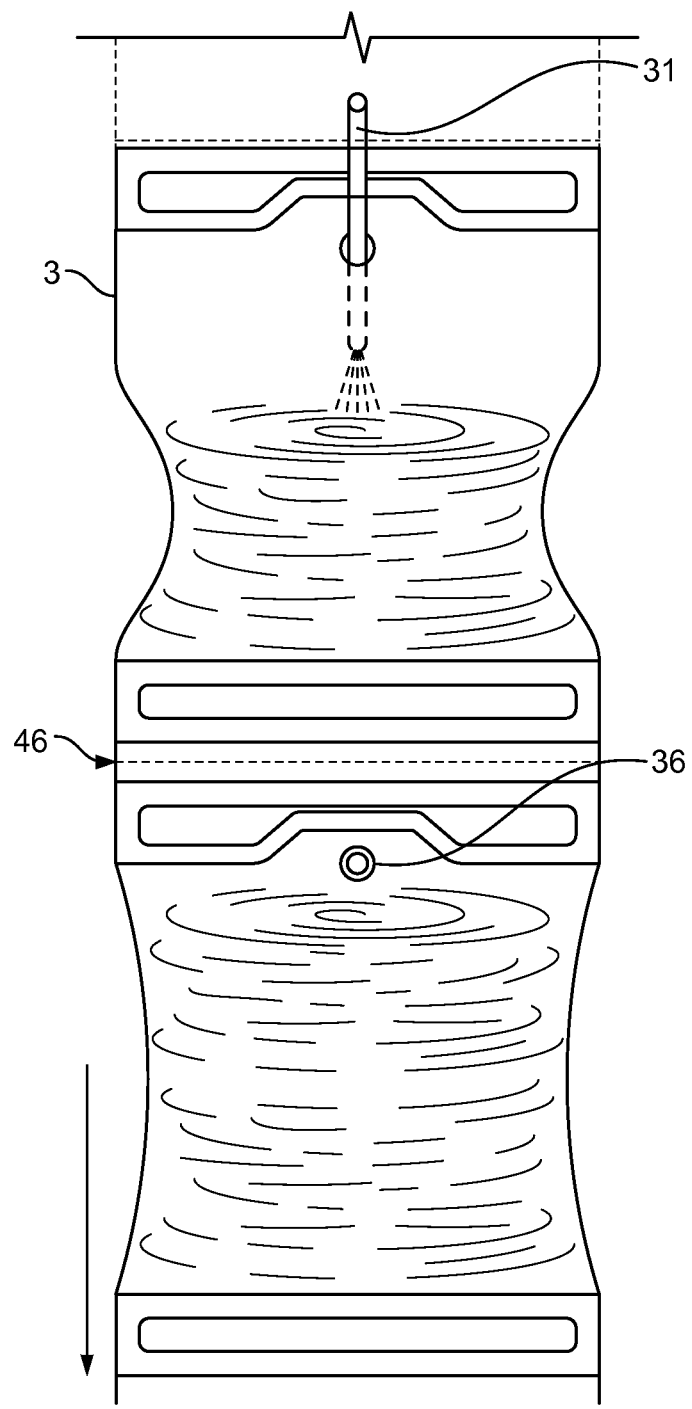
FIG. 7 is a schematic view similar to FIG. 11, showing how a pouch is filled.
Figure 10:
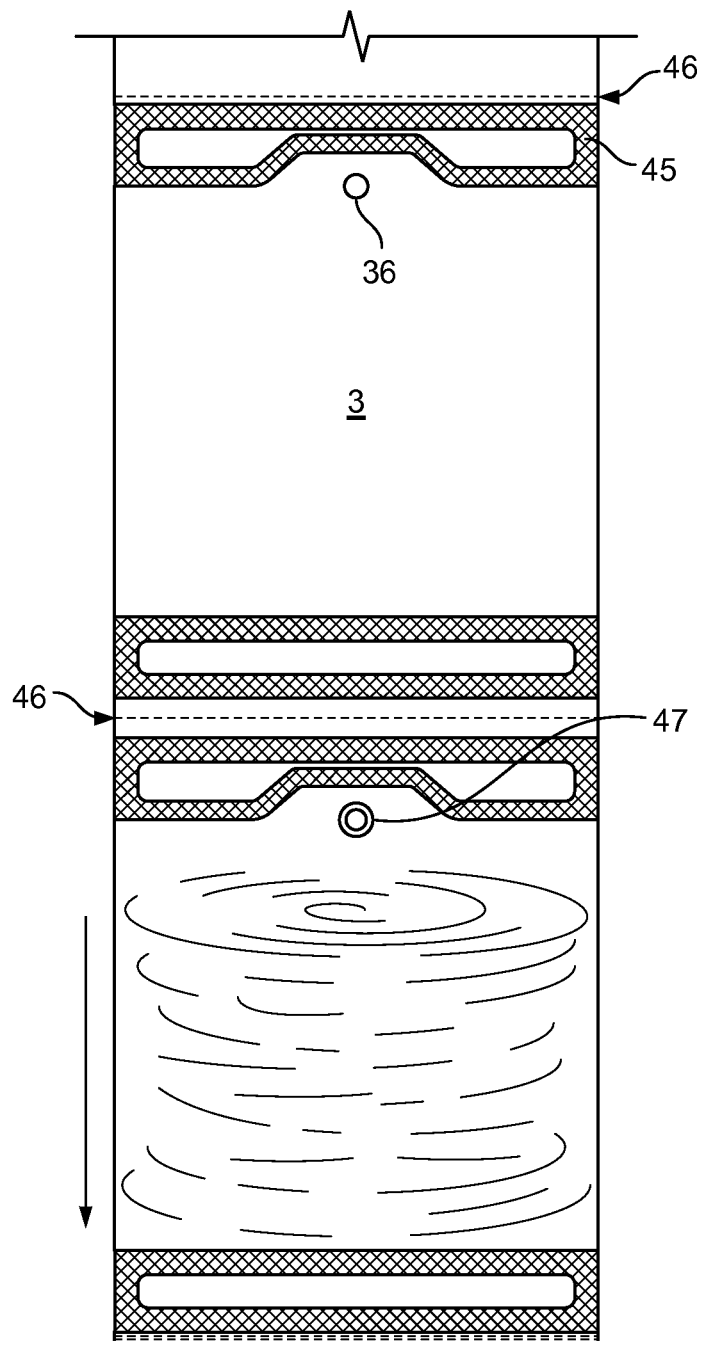
FIG. 10 is a profile view similar to FIGS. 8 and 9, wherein the filling needle is inserted into the pouch filling opening, and a safe beverage is being packed therein.

FIGS. 7 and 10 show two consecutive pouches 3 in the roll of pouches 24. In FIG. 7, the upper pouch in the roll is being filled with drinkable water, by means of a filling needle 31 that is inserted into the pouch opening 36. In both FIGS. 7 and 10, the lower pouch is already filled, and its opening 36 is sealed. It is ready to be detached from the rest of the roll 24 along the pre-cut line 46.

It is clear in FIG. 10 which seals of the pouch 3 pre-exist before the filling step: the pouch opening 36 alone remains unsealed, until the filling step is completed. After the filling step, this opening 36 is sealed as well by a closing seal 47 that is rounded in shape to adapt to the opening shape. The filled pouch 3 is therefore completely and hermetically closed. It is to be noted that the filling and sealing step are done in aseptic conditions. The shape of each pouch is generally parallelepipedic, for instance square, as illustrated in FIG. 10.

Figure 11:
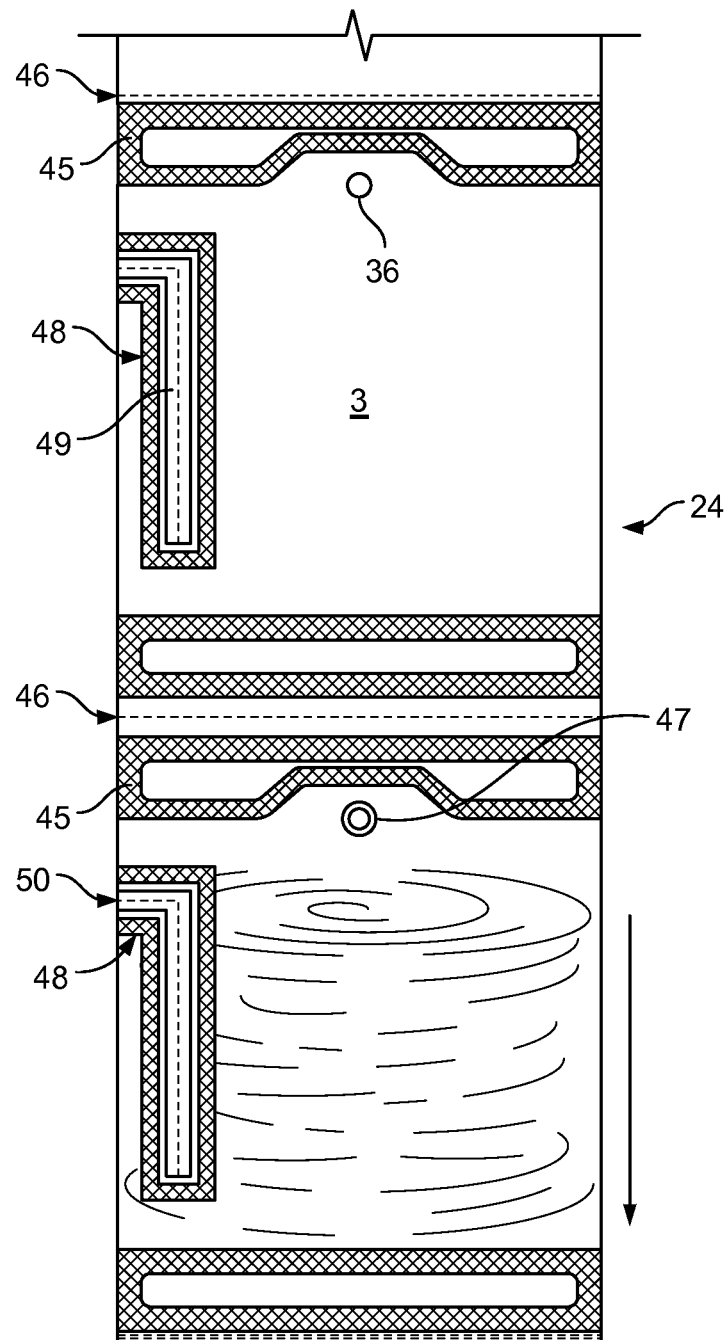
FIG. 11 is a schematic front view showing a pouch that is filled and sealed, and ready to be separated from the rest of the pouches roll.
Figure 12:
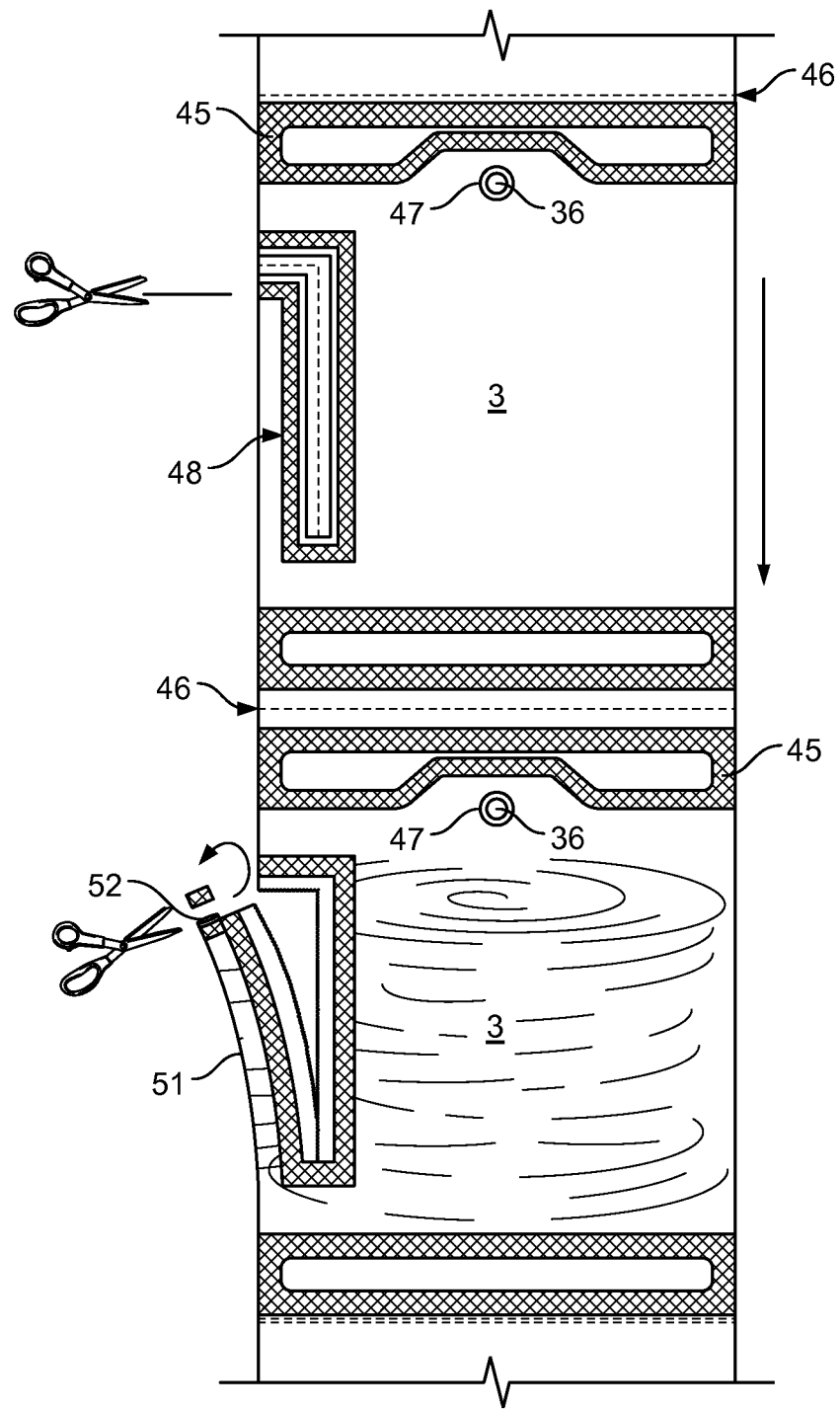
FIG. 12 is a view similar to FIG. 11, showing an alternative embodiment for the pouch construction.

In FIGS. 11 and 12, one can see an alternative pouch design. In this alternative embodiment, the shape of each pouch 3 is generally square or rectangular. Each pouch 3 is formed from a tubular film as described hereinabove, with upper and lower edges which are sealed transversally to close the pouch. Additionally in this embodiment, an L-shaped seal 48 is created that is generally parallel and adjacent to one side of the pouch. This L-shaped seal 48 is not sealed across its entire surface as can be seen in FIG. 11, but its central area 49 is not sealed and comprises a pre-cut line 50, disposed so that the portion of the pouch 3 located between the L-shaped seal 48 and the adjacent side wall can be detached to form a detachable spout 51 as illustrated in FIG. 12. As illustrated in FIG. 12, the free end 52 of the detachable spout (once it is detached from the rest of the pouch 3) can be cut by the consumer before dispensing. The dispensing spout 51 creates a convenient way of dispensing the pouch contents, without requiring a complex shape of the pouch 3.

Figure 13:
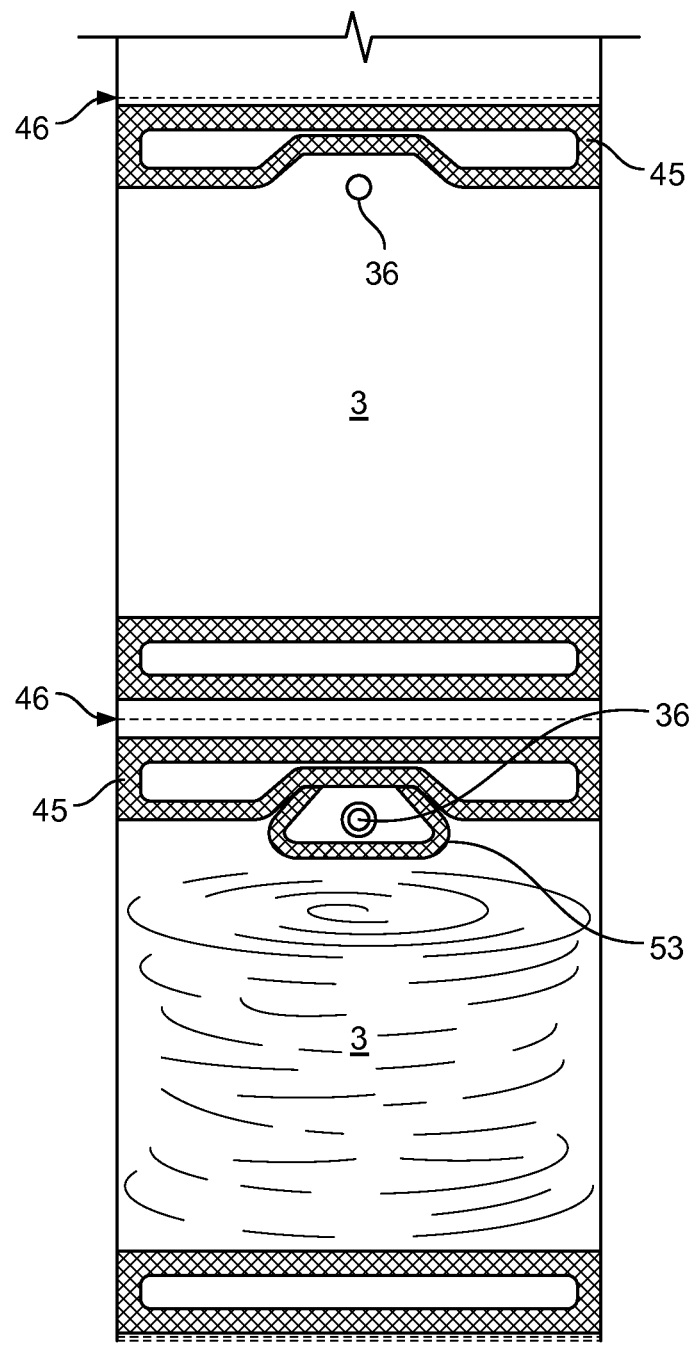
FIG. 13 is a view similar to FIG. 12, wherein one of the pouch is being opened into its dispensing configuration.
Figure 14:
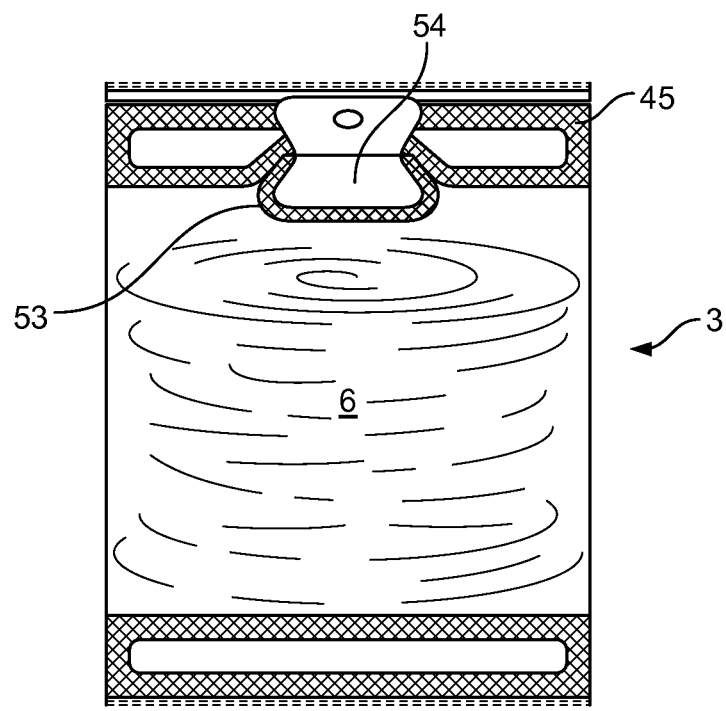
FIG. 14 is a schematic front view showing yet another possible embodiment of a pouch construction, wherein each pouch is equipped with a carrying precut handle.
Figure 15:
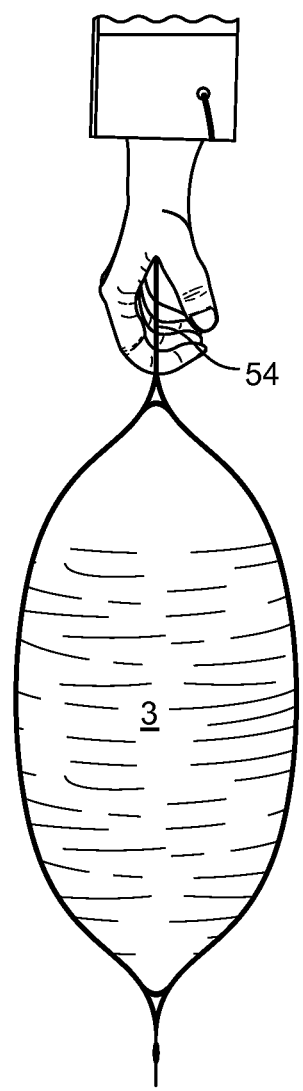
FIG. 15 is a view similar to FIG. 14, wherein a pouch is detached from the rest of the pouch roll, and the precut handle is detached to be usable.

In FIGS. 13, 14 and 15 is illustrated another possible embodiment of a pouch to be used in an apparatus according to the present invention.

In FIG. 13, one can see that each pouch in the roll is generally as formerly described above, i.e. made from a tubular film which is sealed transversally to create the pouch. In this particular embodiment, the pouch 3 comprises an additional, generally U-shaped, seal 53 that comprises in its surface a pre-cut—not shown in the drawing—. This seal 53 surrounds the pouch opening 36 and is made after the pouch 3 is filled. The seal 53 is in fact shaped and disposed so that the opening 36 is completely enclosed between the U-shaped seal 53 and the upper seal of the pouch 45. In this way, when the seal 53 is made, the pouch is completely closed, as can be seen in FIG. 13.

When the portion of the pouch that is enclosed in the U-shaped seal 53 is detached, the pouch remains closed, while an opening 54 is created at the same time, as illustrated in FIG. 14, so that a consumer can insert the hand to hold and carry the pouch as illustrated in FIG. 15.

In another possible embodiment of the invention, a single, premade pouch is manually fed into the filling station, for instance in a pouch inserting opening disposed on the front surface of the water fountain. Inside the fountain, the pouch will be pierced, filled and resealed for on the go consumption, as described herein above.

Preferably in that case, the premade pouch is completely sterilized after sealing to avoid any food safety risk.

In yet another embodiment of the present invention, the premade pouch is a pre-pouch of a thicker material and lower volume than what a fully expanded premade pouch would be. This pouch is either as a reel, stack or as a group of single pouches (it can be possibly fed to the machine by the consumer, i.e. manually, or it is fed automatically from a stock in the fountain as described above). Inside the filling station the premade pouch is preferably at least partially heated to a temperature allowing the deformation of the material. The filling step with the product is conducted with a pressure of the liquid of from 0.5 to 20 bar, preferably from 1 to 10 bar, so as to deform the pouch to its final shape and volume.

With this embodiment, the pre-pouch is smaller in the stock and therefore easier to transport and store, for all, reel, stack or group of single pre-pouches.

Finally, one further advantage of the present invention is the short shelf life of the packages filled with the water fountain. Therefore, preferred packaging materials for the packages to be used with the water fountain of the invention comprise biodegradable material such as polyhydroxyalkanoates (PHA) such as for instance poly-3-hydroxybutyrate (P3HB), poly-4-hydroxybutyrate (P4HB), polyhydroxyvalerate (PHV), polyhydroxyhexanoate (PHH), polyhydroxyoctanoate (PHO) and their copolymers, zein-based bioplastic polymers, starch-based resins, polylactic acid based resins, hemp-based resins, cellulose-based resins, or a combination thereof.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A water fountain for in-home delivery of drinkable water, the fountain comprising:
   a source of drinkable water;
   a stock of packages;
   a filling member for filling at least one package with drinkable water;
   a member for adding at least one ingredient to the water comprising at least one single-use disposable capsule containing the ingredient to be inserted into a dedicated receptacle of the fountain, a pump for pumping the water from the source of water through the single-use disposable capsule so that the ingredient is mixed with the water, and a conductor for conducting the mix of water and ingredient to the filling member for filling the mix into a package; and
   a sealing member for sealing individual filled packages before delivery to the consumer.

2. A water fountain according to claim 1, wherein the source of water is a container located in a receptacle of the water fountain.

3. A water fountain according to claim 1, wherein the source of water is a public water supply connected to the fountain via a leak-proof pipe.

4. A water fountain according to claim 1, wherein the ingredient is selected from the group consisting of: mineral salts, vitamins, flavours, colorants, prebiotics, probiotics, sugar/sweeteners, preservatives, plant extracts, and a combination thereof.

5. A water fountain according to claim 1, wherein the filling member comprises at least one pair of rolls for holding the package, the rolls comprising cooperating grooves that define a passage through which a filling needle can move to fill the package.

6. A water fountain according to claim 1, wherein the stock of packages comprises premade film pouches stored as a continuous roll, so that two adjacent pouches in the roll are linked in a detachable manner by a precut seam.

7. A water fountain according to claim 1, wherein the package contains dry or liquid ingredients.

8. A water fountain according to claim 1, wherein the packages have several separate chambers that can be arranged in different configurations so that they are self standing with a base area.

9. A water fountain according to claim 1, wherein the packages are single use disposable packages.

10. A water fountain according to claim 1, wherein the filling member comprises an anti-contamination member to prevent contamination of water during the filling of packages and ensure an aseptic filling.

11. A water fountain according to claim 10, wherein the anticontamination member comprises a hygienic closed chamber for containing the stock of packages and the filling member.

12. A water fountain according to claim 11, wherein the hygienic chamber is a removable disposable cartridge.

13. A water fountain according to claim 1, wherein the filling member comprises a scale controlling the fill volume into the package.

14. A water fountain according to claim 1, wherein the filling member further comprises a volumetric filling system for the control of the filled volume of beverage into the package.

15. A water fountain according to claim 1, wherein the filling member further comprises a flow meter and/or an intermediate tank for the control of the filled volume of beverage into the package.

16. A water fountain according to claim 1, comprising an automatic sanitation self-cleaning system for cleaning the interior of said fountain.

17. A water fountain according for in-home delivery of drinkable water, the fountain comprising:
- a source of drinkable water;
- a stock of packages;
- a filling member for filling at least one package with drinkable water; and
- a sealing member for sealing individual filled packages before deliver to the consumer, wherein the package is a pre-pouch of lower volume than a final volume, and the pouch can be heated to a temperature allowing the deformation of the material so as to allow the filling step with the product to be conducted with a pressure of from 0.5 to 20 bar so as to deform the pouch to its final volume before sealing of the pouch.

\* \* \* \* \*